United States Patent
Paas et al.

(10) Patent No.: US 8,707,178 B2
(45) Date of Patent: Apr. 22, 2014

(54) APPARATUS, AND ASSOCIATED METHOD, FOR ALERTING A USER OF A MOBILE STATION OF A RECEIVED DATA MESSAGE

(75) Inventors: Julian Paas, Mississauga (CA); Jon-David Lacey, Richmond Hill (CA)

(73) Assignee: BlackBerry Limited, Waterloo (CA)

( * ) Notice: Subject to any disclaimer, the term of this patent is extended or adjusted under 35 U.S.C. 154(b) by 1419 days.

(21) Appl. No.: 11/562,528

(22) Filed: Nov. 22, 2006

(65) Prior Publication Data

US 2008/0119211 A1    May 22, 2008

(51) Int. Cl.
G06F 3/048    (2013.01)
(52) U.S. Cl.
USPC ............ 715/706; 715/837; 715/815; 455/466
(58) Field of Classification Search
USPC ............ 455/466, 414.1, 414.4; 715/810, 815, 715/821–823, 835–837, 846, 705–710, 762, 715/763, 847
See application file for complete search history.

(56) References Cited

U.S. PATENT DOCUMENTS

| | | | |
|---|---|---|---|
| 5,870,683 A * | 2/1999 | Wells et al. | 455/566 |
| 6,456,841 B1 * | 9/2002 | Tomimori | 455/412.2 |
| 6,965,786 B2 | 11/2005 | Qu et al. | |
| 2004/0155909 A1 | 8/2004 | Wagner | |
| 2004/0224670 A1 * | 11/2004 | Hull et al. | 455/412.1 |
| 2006/0018207 A1 * | 1/2006 | Saito | 369/30.01 |
| 2006/0041848 A1 * | 2/2006 | Lira | 715/805 |
| 2006/0084450 A1 | 4/2006 | Dam Nielsen et al. | |
| 2007/0260999 A1 * | 11/2007 | Amadio et al. | 715/804 |

FOREIGN PATENT DOCUMENTS

| | | |
|---|---|---|
| EP | 1613042 | 1/2006 |
| WO | 2004044727 A1 | 5/2004 |

OTHER PUBLICATIONS

Canadian Intellectual Property Office, Office Action for Canadian Application No. 2,670,043, dated Nov. 7, 2012, 2 pages.
European Patent Office, Communication pursuant to Article 94(3) EPC, dated Jan. 5, 2009, 4 pages.

* cited by examiner

*Primary Examiner* — Allahyar Kasraian
(74) *Attorney, Agent, or Firm* — Alexander Anishchenko; Borden Ladner Gervais LLP (57) ABSTRACT

Apparatus, and an associated method, for visually alerting a user of a newly-received data message at a mobile station. A detector detects delivery of the message at the mobile station. And, in response to the detection of the delivery, a display driver causes display on a display device of an animated icon to alert the user of the newly-received message.

9 Claims, 6 Drawing Sheets

APPARATUS, AND ASSOCIATED METHOD, FOR ALERTING A USER OF A MOBILE STATION OF A RECEIVED DATA MESSAGE

The present invention relates generally to a manner by which to provide an indication to a user of a mobile station of delivery of a new data message at the mobile station. More particularly, the present invention relates to apparatus, and an associated method, by which to display an identifier on a display screen viewable by the user that a new data message has been received.

An animated icon, such as an icon that appears to pulse, is displayed on the display screen. The icon identifies the receipt of the new message, and its animation makes its display more noticeable to the user. The animation icon is displayed, even if, and especially if, the user is not otherwise operating the message data application of the mobile station. Responsive to the alert provided by the animated icon, the user is alerted to the delivery of the new message and is able to elect whether to view the message.

BACKGROUND OF THE INVENTION

Mobile communications are pervasive in modern society. In various mobile communication systems, mobile stations are utilized through which to communicate. Mobile stations typically are radio transceivers, oftentimes of dimensions and weights permitting their easy carriage by users. A cellular communication system is an exemplary type of mobile communication system in which mobile stations are used. Cellular communication systems of various types and constructions are widely deployed and widely utilized through which to communicate. A user, sometimes referred to as a subscriber, generally carries a portable, mobile station and communicates with, and through, a cellular communication system through use of the mobile station.

Mobile stations were initially used primarily pursuant to voice communications. Increasingly, however, mobile stations are used pursuant to text-messaging services, and other data-based services. Mobile stations, and the cellular communications systems in which the mobile stations are operable, are regularly now operable to provide store-and-forward, push-message, and other message-related services. Messaging services communicate data in manners that, typically, do not require a recipient immediately to be available to review and to reply to a communicated message. Rather, the user is able to review the message at a subsequent time and to take further action, such as the generation of a reply message, if appropriate, when convenient.

Dual advantages are provided in a mobile communication system that provides for messaging services. That is to say, both communication mobility and communication flexibility are provided when messaging services are utilized by a user of a mobile station that is message-service capable.

Some mobile station users make regular use of messaging services. Numerous messages, for instance, might be delivered to the mobile station over a period of time, such as the user's workday. The messages, once delivered to a mobile station are buffered thereat, available for viewing by the user at the convenience of the user. At least one message-capable mobile station provides a message data application that generates a message listing forming a list of messages received at the mobile station. Each individual entry on the message list, for instance, identifies the time at which the message is received, the identity of the sender of the message, and, if available, and a subject line populated with a subject entered by the sender of the message. The user at the mobile station uses the message listing and elects whether to view the associated message, associated with the entry on the message listing.

Some mobile stations provide for the generation of an alert when a message is received at the mobile station. Audible alerts, for instance, are sometimes generated at the mobile station to alert the user of receipt of a message. In some situations, however, the user is likely not to want to have the message audibly alerted. Generation of an audible alert, of any volume, might, in some situations, be inappropriately loud. Or, the user might not want to be distracted by the generation of an intrusive, audible alert. And, in any event, an audible alert is generally only temporal, that is, is typically only generated for a brief period. If the user elects not immediately to take further action with respect to the received message, the user might well quickly forget that the message has been received and alerted.

Visual alert of a received message is also, or alternately, provided at a mobile station. A visual alert is generally less intrusive and is more easily made to be less temporal, that is to say, more easily made to be long-lasting. In one conventional alert mechanism, a light emitting diode is caused to light, sometimes with an on-off, blinking alert, to alert a user of a received message. The light emitting diode alert, however, is not part of the screen display to which a user generally directs attention when viewing the mobile station. In another existing arrangement, for instance, an icon is caused to be displayed on the mobile-station, display screen when a new message is received. The icon continues to be displayed until the user takes further action with respect to a message data application. For example, the icon is continued to be displayed until the user utilizes the message data application, such as to view a message listing generated during its operation.

Mere display of a static icon, however, might sometimes be overlooked by the user of the mobile station. The display screen of a mobile station is generally of small dimension, and the icon identifying the reception of the new message is displayed on only a small portion on of the screen display.

If an improved manner could be provided by which to visually alert a user of the reception of the message, improved user experience would be provided. The improved visual alert would be particularly beneficial if it were displayable as part of a screen display that is displayed in a power-saving manner, e.g., a screen display displayed only when the user views the screen display.

It is in light of this background information related to message-capable mobile stations that the significant improvements of the present invention have evolved.

DETAILED DESCRIPTION

The present invention, accordingly, advantageously provides apparatus, and an associated method, by which to provide an indication to a user of a mobile station of delivery of a new data message at the mobile station.

Pursuant to operation of an embodiment of the present invention, a manner is provided by which to display an identifier on a display screen viewable by the user to indicate that a new data message has been received at the mobile station.

In one aspect of the present invention, an animated icon, such as an icon that appears to pulse, is displayed on the display screen. When a new data message is detected to have been received, the animated icon is caused to be displayed upon the display screen. The animation of the icon, such as its pulsing, increases its visibility to a user of the mobile station, thereby to increase the likelihood that the mobile-station user shall notice the visual alert and make election whether to take further action with respect to viewing of the associated received message.

The animated icon is displayed upon the display screen prior to operation of a message data application at the mobile station and, when displayed, alerts the user of the mobile station of the received message, thereby to permit election by the user to commence with operation of the message data application, such as to examine a message listing that lists received data messages and, subsequently, viewing the contents of the received message.

In another aspect of the present invention, the animated icon is displayed together with a message data application icon. The message data application icon identifies the message data application resident at the mobile station. The display of the message data application icon together with the animated icon permits the user to associate the animated icon with the message data application icon, thereby to be notified of the reception at the mobile station of the received data message.

In a further aspect of the present invention, the animated icon is overlaid upon the message data application icon. Its overlay upon the message data icon identifies to the user that the icon is associated with a message data application and is an alert that alerts the user of the reception of the new data message. The message data icon is positioned, for instance, at a tool bar displayable at the display screen, e.g., a home screen to which the mobile station defaults when the user is not operating, e.g., running, other applications. The toolbar defines, for instance, a ribbon that is situated to extend along a bottom, or other, border of the home screen display. Other application icons are also displayable at the toolbar or ribbon. And, by overlaying the animated icon upon the message data icon, the user of the mobile station is visually alerted to the reception of the new data message.

In another aspect of the present invention, the animated icon pulses for a selected number of pulses, e.g., a single pulse when the user turns on, or otherwise causes, the home screen to be displayed upon a display device of the mobile station. The single pulse of the animated icon better alerts the user of the mobile station of the received message without becoming a visual nuisance to the user in the event that the user chooses not immediately to take further action with respect to the alert. Or, the animated icon is displayed for a selected period of time, e.g., three seconds. The time period is, e.g., selectable. The animated icon is displayed together with display of a display screen. When the screen display exits an idle mode and enters into a display mode, the animated icon display commences, e.g., for the three-second time period, for a selected number of pulses, or otherwise until the animated icon times out.

In another aspect of the present invention, the animated icon is formed by displaying two or more icons over successive time periods. The pulsing effect is created, for instance, by displaying the same icon but of different sizes, during successive time periods. An icon of a first size is displayed during a first time period. Then, the icon, of the same configuration, but of a different size, is displayed during a following time period. Multiple icons, each of different sizes, for instance, create a smoothing of the apparent pulsation of the icon. In whatsoever form, through its animation, the animated icon provides an improved alert to a user of the mobile station of the delivery of the new message.

In another aspect of the present invention, detection is made of the delivery of a new data message at the mobile station. The icon is caused to be displayed to alert the user of the reception of the message subsequent to a detection start. The detection start is defined, for instance, to be subsequent to a most-recent viewing of a message listing or other operation of the message data application. The same animated icon is displayable, for instance, even if multiple new messages are received. Or, alternately, the animated icon further provides an indication if multiple numbers of messages have been received. Or, the animated icon displays the number of new messages that have been received. In whatsoever implementation, an improved alert is provided to the user of the mobile station to facilitate alerts to the user of the newly-received message, thereby improving the user experience of operation of the mobile station. The display is displayed together with a screen display that otherwise is displayed when the user elects to view the display screen. Thereby, the alert does not unduly increase power consumption of the mobile station.

In these and other aspects, therefore, apparatus, and an associated method, is provided for a mobile station operable to receive data messages. A display device is configured to provide display indicia related to reception of data messages at the mobile station. A detector is configured to detect reception of a newly received data message subsequent to a selected detection.start. A display generator is configured to cause display upon the display device of the display indicia responsive to detection of the reception of the newly-received message. The display indicia that is caused to be displayed includes an animated indication formed of a first display indicia and of the second display indicia.

Figure 1:
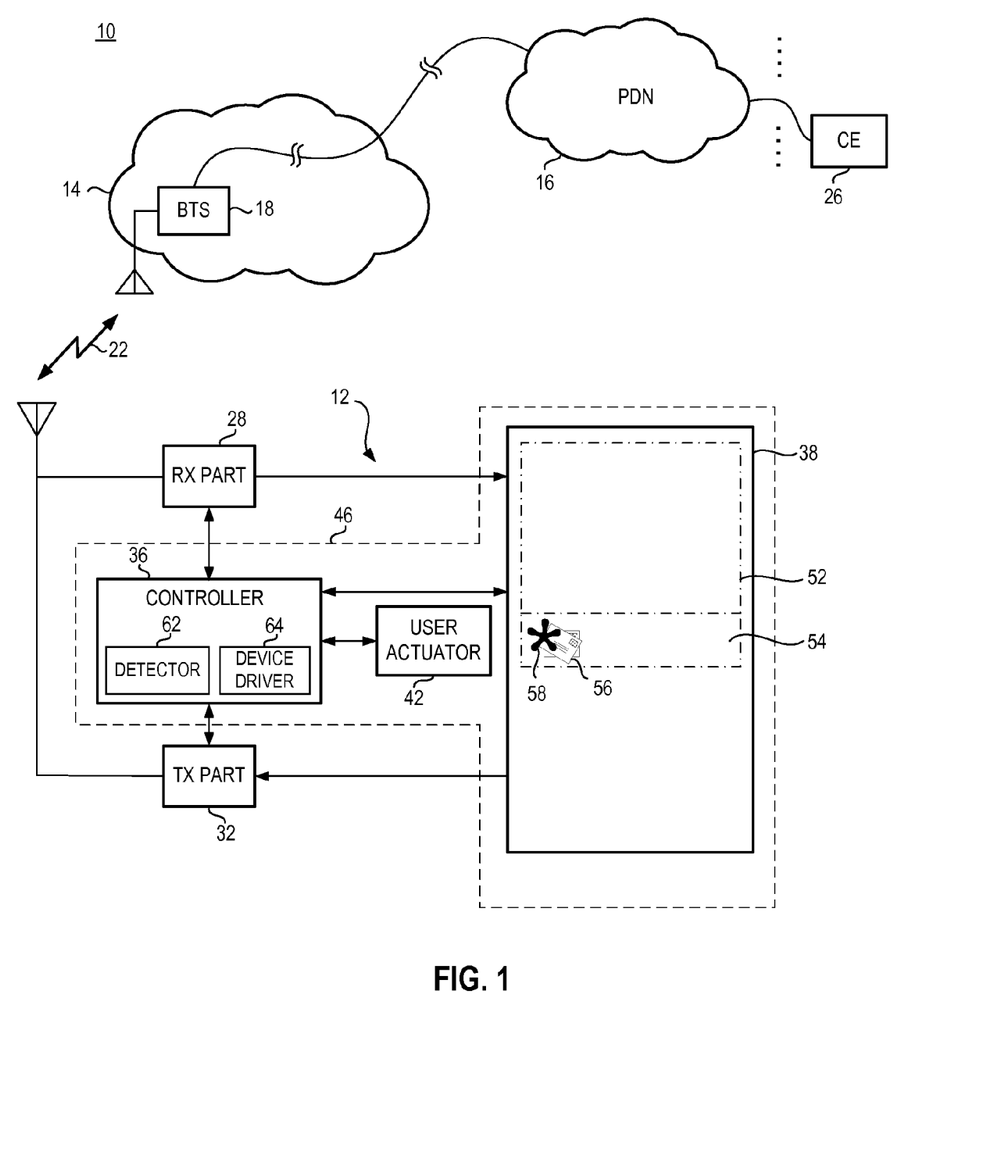
FIG. 1 illustrates a functional block diagram of a radio communication system in which an embodiment of the present invention is operable.

Referring first to FIG. 1, therefore, a communication system, shown generally at 10, provides for communications with mobile stations, of which the mobile station 12 is representative. In the exemplary implementation, the communication system 10 forms a cellular communication system that provides for data communication services, such as a GSM/GPRS/EDGE (Global System for Mobile Communications/General Packet Radio Service/Enhanced Data for GSM Evolution) system or CDMA (Code Division Multiple Access) system that provides for EVDO (Evolution Data Optimized) communication services. More generally, the communication system 10 is representative of any of various types of mobile radio, or other, communication systems that provide messaging services with a mobile station. The following description shall describe exemplary operation of the communication system with respect to the exemplary implementation in which the communication system 10 forms a cellular communication system. An embodiment of the present invention is analogously operable on other types of communication systems and description of operation and such other types of communication system is analogous to that given below.

A network part of the communication systems are shown to include a radio access network (RAN) 14 and a packet data network (PDN) 16. The portions 14 and 16 of the network part are connected together in conventional manner, such as by way of Gateway elements (not separately shown in FIG. 1). A base transceiver station (BTS) 18 forms part of the radio access network. The base transceiver station operates to transceive signals with mobile stations, such as the mobile station 12 by way of a radio air interface, represented by the arrow 22. Signals are formatted and sent in conformity with the communication standards pursuant to which the communication system operates.

A communication endpoint, such as the communication endpoint 26 is representative of a communication device at which messages are originated, or terminated, during operation of the communication system to provide a messaging service. Data messages originated at the communication endpoint 26 are transported through the network part of the communication system, sent by way of the radio air interface 22, and delivered to the mobile station 12. And, messages originated at the mobile station are communicated in reverse direction for delivery to the communication endpoint.

The mobile station 12 includes transceiver circuitry, here represented by a receive (RX) part 28 and a transmit (TX) part 32. The transceiver circuitry operates to transceive signals with a base transceiver station, such as the BTS 18 with which the mobile station is in communication connectivity. The mobile station further includes a controller 36 that controls operation of the mobile station, including the receive and transmit parts thereof.

The mobile station also includes a display device 38 and a user actuator 42. The display device and the user actuator together form a user interface through which a user of the mobile station interacts pursuant to operation of a mobile station. The controller is here shown further to be in connection with the display device and the user actuator. The controller, amongst other things, operates as a display device driver to drive the display of display screens on the display device. The elements 36, 38, and 42 form elements of an apparatus 46 of an embodiment of the present invention. The apparatus functions, amongst other things, to alert a user of delivery of a new data message at the mobile station. The alert is caused to be displayed upon the display device in a manner that is noticeable to the user of the mobile station, thereby to permit the user early to elect whether to view investigate whether to view the message.

The display device is capable of displaying any of various screens associated with various applications executable, or otherwise performable, at the mobile station.

Amongst the screen displays displayable upon the display device is a home screen, such as the home screen 52 shown at the display device illustrated in FIG. 1. The home screen includes a toolbar 54, here extending along a bottom border of the display screen. The toolbar includes an icon 56 that represents an application resident at, or otherwise available for operation of, the mobile station. Appropriate user actuation of the user actuator invokes operation of an application associated with a corresponding icon. And, upon invoking the application, the display device is caused to display an appropriate screen display associated with the invoked application.

Amongst the application icons displayable at the toolbar 54 is the message data icon. The message data icon 56 is illustrated in FIG. 1 and represents a message data application resident at the mobile station. The other application icons are displayable at the toolbar of the home screen, identifying other associated application resident at the mobile station.

During operation of the mobile station, data messages are sent thereto and, once delivered, are available for viewing by a user of the mobile station. The user, however, may or may not immediately be available to view the data message. And, while the mobile station sometimes is capable of generating an audible alert to alert the user of the mobile station of the delivery of the data message, the audible alert is relatively intrusive and its sounding is sometimes inappropriate or otherwise not wanted by the user.

Operation of the apparatus 46 of an embodiment of the present invention provides a manner by which to visually alert the user of the delivery of the new data message. The visual alert is displayed upon the display device 38 in a manner that facilitates notice to be taken by the user of the alert. Specifically, pursuant to operation of an embodiment of the present invention, an animated icon is displayed at the display device to alert the user of the newly-received message. The animated icon is displayed together with the screen display to be viewable by the user when the screen display is generated. When the screen display is not generated, the animated icon is not displayed, thereby not to increase power consumed by the mobile station.

The animated icon, in the exemplary implementation, is displayed at the toolbar 54, indicated in FIG. 1 at 58, displayed together with the associated message data application icon 56. In the exemplary implementation, when the animated icon is caused to be displayed, the animated icon 58 is overlaid upon the message data application icon 56. The animation on the icon continues for a selected period and then, in the exemplary implementation, a non-animated icon continues to be displayed, that is, overlaid upon the data message application icon. Through the use of an animated icon, the alert made to the user is made more visible, making the user more likely to notice the alert of the reception of the newly-received data message. When a user of the mobile station elects to enter into the data message application or elects not to enter into the application, such as to learn of the identity of the originator of the message or to read the message in its entirety, the animated icon is no longer displayed.

In exemplary operation, the controller includes a detector function 62 that operates to detect delivery at the mobile station of the data message. A new message is determined by the detector to have been received if the message has been received subsequent to the user's last use of the message data application, e.g., the user's prior checking of a message listing or otherwise checking for delivery of a data message. When detection is made, a display device driver 64, also embodied at the controller, causes the animated icon to be overlaid upon the message data application icon 56. Upon termination of the display, or election by the user to enter into the message data application, the animation of the icon terminates.

Figure 2:
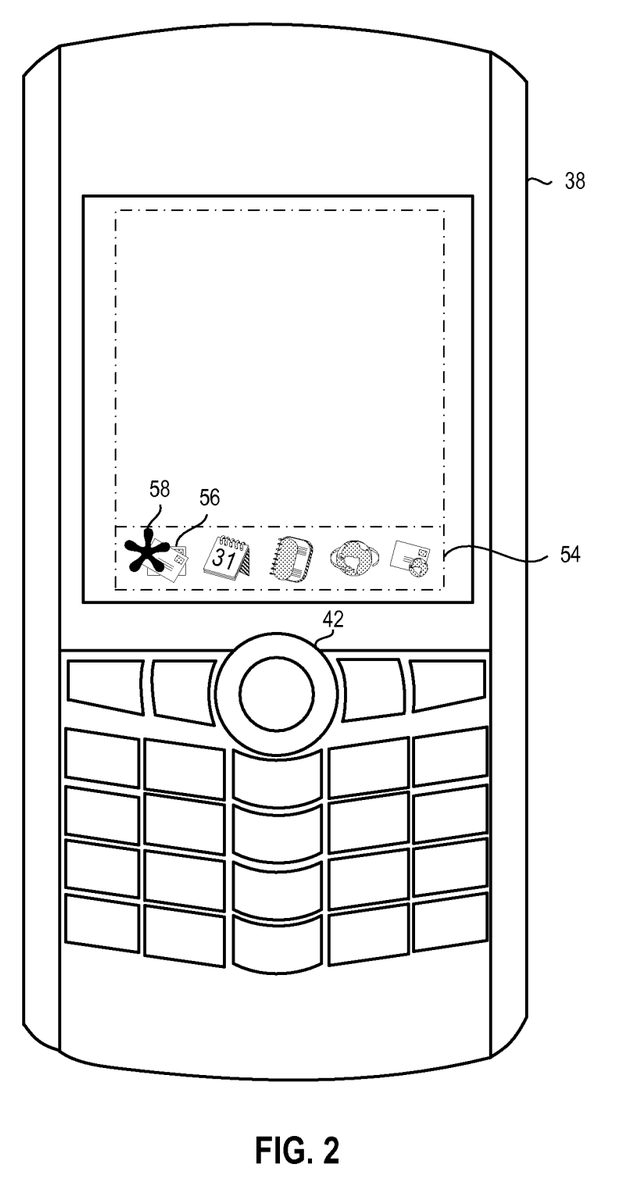
FIG. 2 illustrates a representation of a mobile station including an exemplary display screen generated pursuant to operation of an embodiment of the present invention.

FIG. 2 illustrates a representation of the display device 38, shown in FIG. 1 to form part of the mobile station 12. The display device here shows a home screen display containing the toolbar 54 and the message data icon as a portion thereof. The animated icon 58 is caused to be overlaid upon the message data icon at the toolbar. In an exemplary implementation, the animated icon forms a pulsing icon, e.g., of a red color. To create a pulsing appearance, the animated icon is formed of a first icon and at least a second icon, the first and second icons of identical configuration, but of differing sizes. Pulsing appearances created by displaying the first and second icons during successive time periods. In one embodiment, a single pulse is created by displaying a first icon for a first time period and a second icon for a second time period. FIG. 2 illustrates the display of the first icon, of the first size, overlaid upon the message data application icon. In one implementation, the animated icon is displayed for a selected period of time, e.g., three seconds. The time period is, e.g., selectable. Or, the time period is a set time length, defined at system installation. The animated icon is displayed together with display of a display screen. When the screen display exits an idle mode and enters into a display mode, the animated icon display commences, e.g., for the three-second time period, for a selected number of pulses, or otherwise until the animated icon times out.

Figure 3:
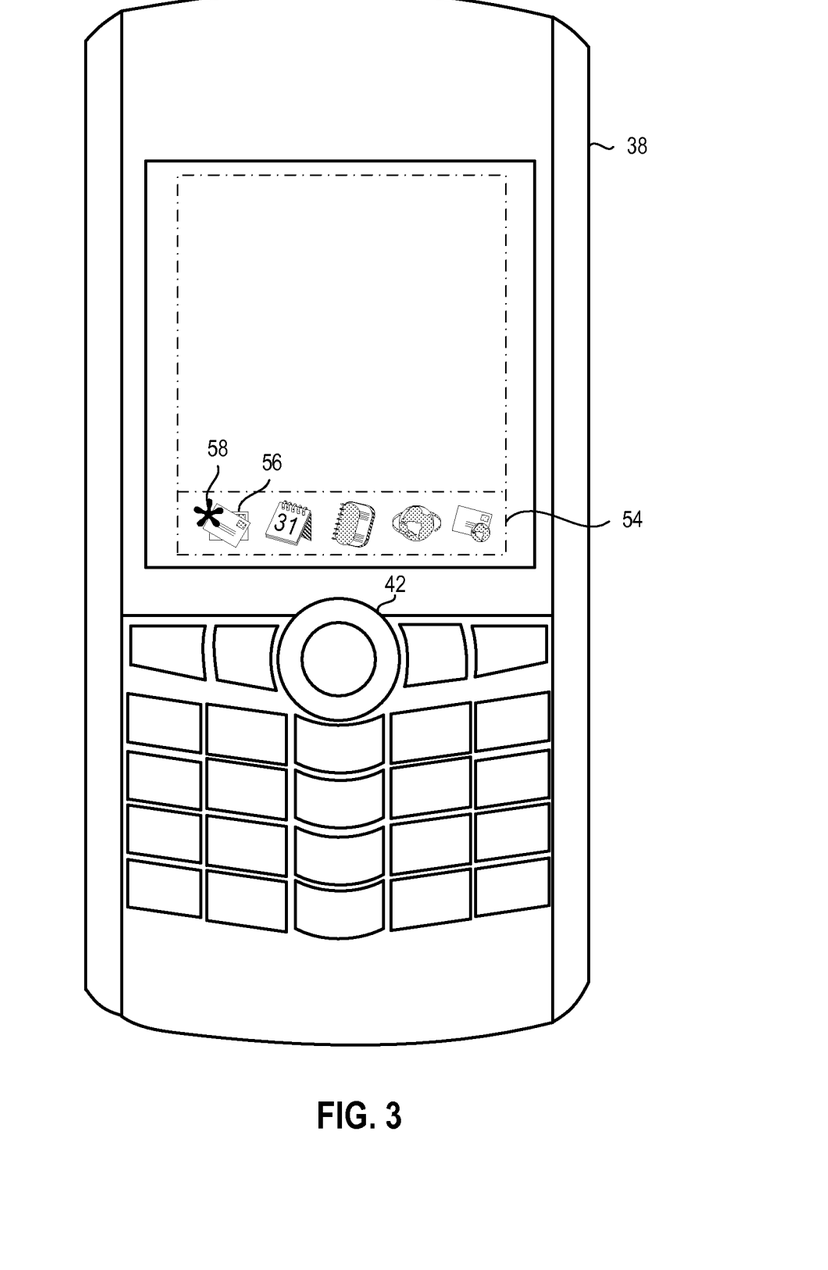
FIG. 3 illustrates a representation of a mobile station, similar to that shown in FIG. 2, but here showing another exemplary display screen generated pursuant to additional operation of an embodiment of the present invention.

FIG. 3 again illustrates a representation of the home screen displayed upon the display device, here again showing the toolbar 54 and the message data application icon 56 populated therein. And, again, the animated icon 58 is displayed at the toolbar 54, overlaid upon the message data application icon. Here, a second display icon, of a size different than the first display icon, is displayed. When appropriately displayed during a time period following the display of the first display icon of the animated icon, the pulsing effect is created. In a further implementation, multiple icons are displayed during successive time periods, thereby effectively smoothing the pulsing of the animated icon.

FIG. 4 again illustrates the display device 38 and the home screen displayed thereon. The toolbar 54 is again displayed together with the message data application icon. Here, the display is representative of the display subsequent to election by the user to enter into the message data application or to ignore the alert, i.e., not to enter into the message data application.

Figure 4:
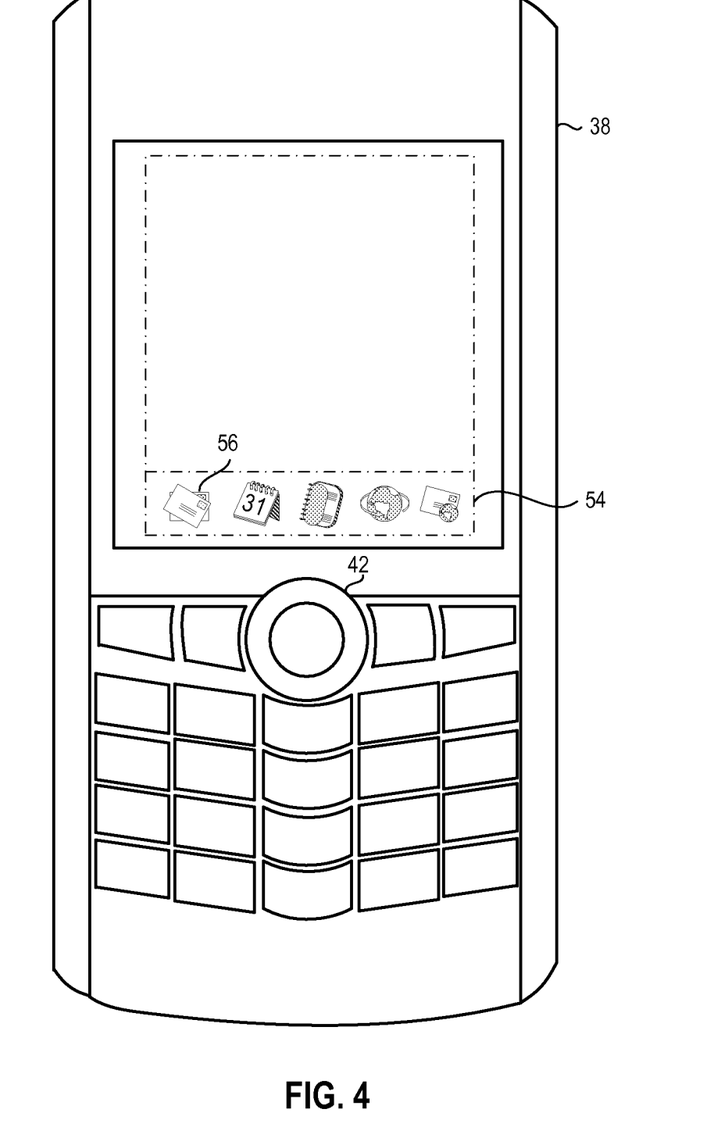
FIG. 4 illustrates a representation, similar to those shown in FIGS. 2-3, but here showing another exemplary display screen generated pursuant to operation of an embodiment of the present invention.

FIG. 4 illustrates another representation of the display device, here again showing the home screen and the toolbar formed along the border thereof. Here, the display is representative of the screen display subsequent to the user electing to enter into the message data application or to ignore the alert. The animated icon, previously overlaid upon the message data application icon, is removed and is no longer displayed at the toolbar of the home screen. That is to say, the alert has already been made, and the user has chosen some action so that the alert no longer needs to be displayed.

Figure 5:
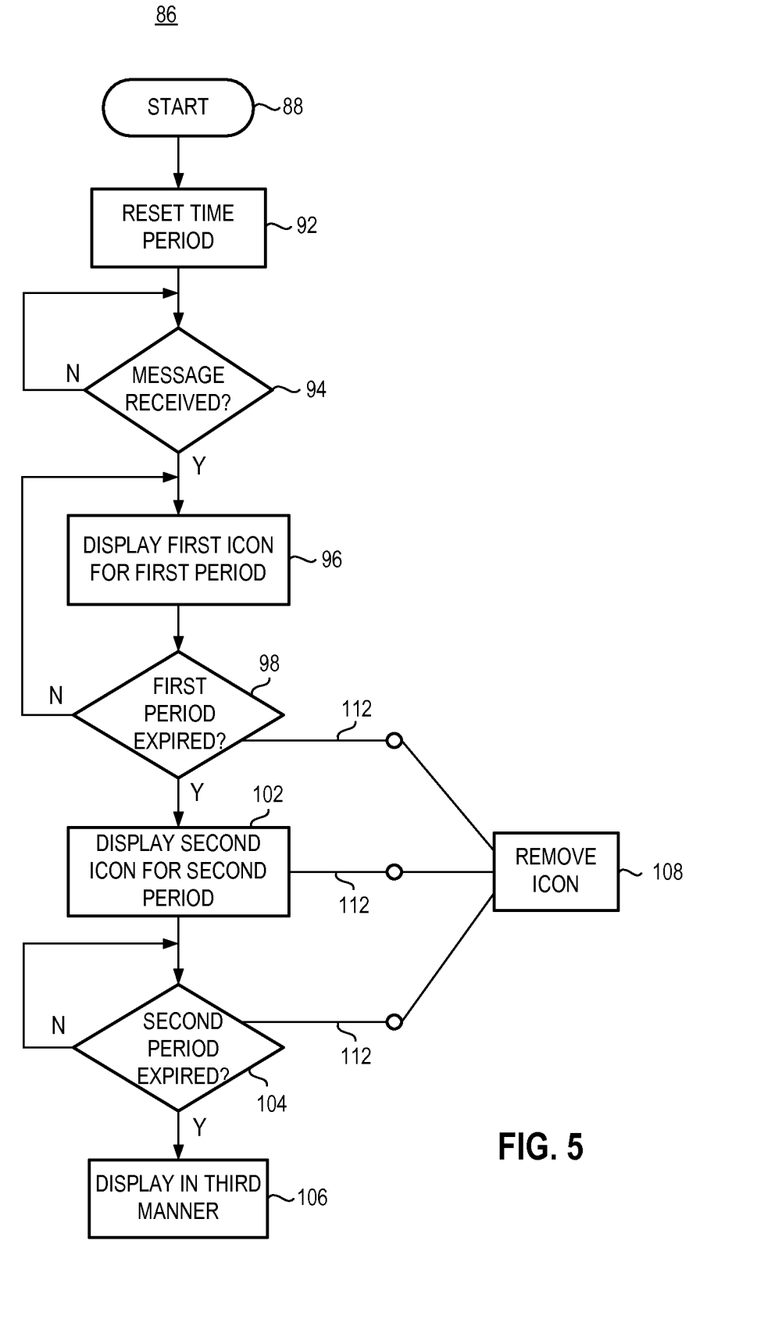
FIG. 5 illustrates a process diagram representative of the process carried out pursuant to an embodiment of the present invention.

FIG. 5 illustrates a process diagram, shown generally at 86, representative of operation of an embodiment of the present invention by which to annunciate, or otherwise alert, a user of a mobile station of a newly-received data message.

Subsequent to entry, indicated by the start block 88, a time period reset is performed, indicated by the block 92. Then, and as indicated by the decision block 94, a determination is made as to whether a new data message has been received subsequent to the time period reset. If not, the no branch is taken back to the decision block. Otherwise, the yes branch is taken to the block 96, and a first icon of an animated icon is displayed.

Then, and as indicated by the decision block 98, a determination is made as to whether a first period has timed out. If not, the no branch is taken back to the block 96. Otherwise if the yes branch is taken, the path is taken to the block 102, and a second display icon of the animated icon is caused to be displayed. And, a path is taken to the decision block 104, where a determination is made as to whether the second period has timed out. If not, the no branch is taken back to a decision block. Otherwise yes branch is taken to the block 106 whereat display continues pending further action. At any point subsequent to display of the first icon of the animated icon, if the user takes selected action, such as to enter into the message data application, the animated icon is removed from the screen display, indicated by the block 108. Segments 112 are representative of interrupt paths that are taken to the removed block 108.

Figure 6:
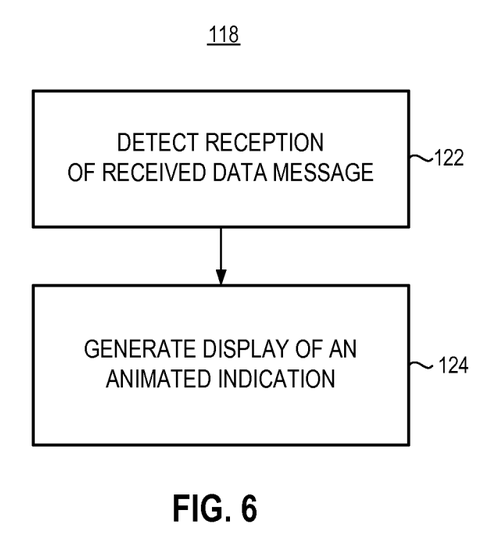
FIG. 6 illustrates a method flow diagram representative of the method of operation of an embodiment of the present invention.

FIG. 6 illustrates a method, shown generally at 118, representative of the method of operation of an embodiment of the present invention. The method facilitates alerting of reception of a received data message at a mobile station.

First, and as indicated by the block 122, detection is made of reception of a received data message at the mobile station. Then, and as indicated by the block 124, responsive to detection of the received data message, a display is generated at a display device of an animated indication formed of a first display indicia and a second display indicia.

Because of the animation of the visual alert, the user is better able to notice the visual alert.

The previous descriptions are of preferred examples for implementing the invention, and the scope of the invention should not necessarily be limited by this description. The scope of the present invention is defined by the following claims.

What is claimed is:

1. A method for facilitating alerting of a reception of a received data message at a mobile station, the method comprising:
   displaying, on a display of the mobile station, application icons including a message data application icon;
   in response to detecting reception of a newly-received data message subsequent to a selected detection period start, displaying, on the display of the mobile station, an animated icon to provide a visual alert of the reception of the newly received data message, the animated icon being displayed on the display such that the animated icon partially overlays the message data application icon, displaying the animated icon comprising:
      displaying an indicia at a first size for a first predetermined time period;
      displaying the indicia at a second size for a second predetermined time period after the first predetermined time period expires, the second size being smaller than the first size; and
      repeating displaying the indicia at the first size for the first predetermined time period and the displaying the indicia at the second size for the second predetermined time period until a timeout time period expires, to generate a pulsed appearance of the indicia.

2. The method of claim 1, further comprising:
   after the timeout time period expires, displaying the indicia at a constant size.

3. The method of claim 1, further comprising:
   discontinuing displaying the animated icon in response to detecting a selection of the message data application icon.

4. The method of claim 1, wherein displaying, on a display of the mobile station, application icons including a message data application icon comprises displaying the application icons in a toolbar on the display.

5. A tangible, non-transitory computer-readable medium having computer-readable code executable by a controller of a mobile station to perform the method of claim 1.

6. A mobile station comprising:
   a display configured for displaying application icons including a message data application icon;
   a controller operably coupled to the display and configured for:
      in response to detecting of reception of a newly received data message subsequent to a selected detection period start, displaying, on the display, an animated icon to provide a visual alert of the reception of the newly received data message, the animated icon being displayed on the display such that the animated icon partially overlays the message data application icon, displaying the animated icon comprising:

displaying an indicia at a first size for a first predetermined time period;

displaying the indicia at a second size after the first predetermined time period expires, the second size being smaller than the first size; and repeating displaying the indicia at the first size for the first predetermined time period and the displaying the indicia at the second size for the second predetermined time period until a timeout time period expires, to generate a pulsed appearance of the indicia.

7. The mobile station of claim 6, wherein the controller is further configured for:

after the timeout time period expires, displaying the indicia at a constant size.

8. The mobile station of claim 6, wherein the controller is further configured for:

discontinuing displaying the animated icon in response to detecting a selection of the message data application icon.

9. The mobile station of claim 6, wherein the display is configured for displaying the application icons in a toolbar.

* * * * *